United States Patent Office 3,398,118
Patented Aug. 20, 1968

3,398,118
PROCESS FOR THE PREPARATION OF
ORGANOPOLYSILOXANES
Jean-Henri Baronnier and Georges Leon Pagni, Lyon,
France, assignors to Rhone-Poulenc S.A., Paris, France,
a French body corporate
No Drawing. Filed Feb. 8, 1967, Ser. No. 614,559
Claims priority, application France, Feb. 11, 1966,
49,336
12 Claims. (Cl. 260—46.5)

ABSTRACT OF THE DISCLOSURE

The invention provides a process for the preparation of organopolysiloxanes by rearrangement and polymerization of cyclic or linear organopolysiloxanes using as catalyst the product obtained by the reaction of an alkali metal with an aminophosphine oxide.

---

This invention relates to the preparation of organopolysiloxanes by rearrangement and polymerization of branched or unbranched cyclic or linear organopolysiloxanes.

It is known that organopolysiloxanes of low molecular weight may be polymerized and rearranged to convert them into organopolysiloxanes of higher molecular weight, in the presence of basic catalysts such as alkali metal hydroxides, alkali metal silanolates, alkali metal alcoholates, and quaternary ammonium hydroxides.

Certain organic compounds have been employed in combination with these basic catalysts to obtain more rapid polymerization. Thus, in French Patent No. 1,078,-412, it has been proposed to carry out the operation in certain nitriles or certain amides, while in French Patents Nos. 1,354,443 and 1,359,414 it has been proposed to add small quantities of alkylsulphoxides or alkylsulphones to the reaction medium to obtain the same result.

Morton and Bostick [Journal of Polymer Science, 32, p. 530 (1958), and 2, Part A, February 1964, pp. 523–538] have also succeeded in polymerizing octamethylcyclotetrasiloxane at low temperature, using as catalyst sodium naphthalene, potassium naphthalene or even finely divided sodium or potassium, operating in tetrahydrofuran, which is eliminated and recovered at the end of the polymerization.

The present invention provides a process for the preparation of an organopolysiloxane by the rearrangement and polymerization of a less highly polymerized or cyclic organopolysiloxane, which comprises subjecting the said less highly polymerized or cyclic organopolysiloxane to the action of, as catalyst, the product obtained by the reaction of an alkali metal with an aminophosphine oxide.

It is known [see Normant, Comptes Rendus de l'Academie des Sciences, 258, p. 3502 (1964), Bulletin de la Societe chimique de France, p. 1561 and pp. 3441–3456 (1965)], that the alkali metals, such as lithium, sodium and potassium, dissolve in the tris(dimethylamino)phosphine oxide (also called hexamethylphosphorotriamide, or more simply HMPT) to form a complex of the formula:

$$O \doteq P[N(CH_3)_2]_3^- M^+ \quad \text{(I)}$$

in which M represents an alkali-metal atom. This complex has low stability and may either be allowed to change spontaneously or be stabilised by the addition of an apolar aromatic hydrocarbon such as benzene or a sparingly polar aromatic hydrocarbon such as ethylbenzene or a xylene. It is also known that, on ageing, which may be accelerated by heating, the complex of Formula I may be converted into another complex. This conversion appears to take place in accordance with the following reaction mechanism:

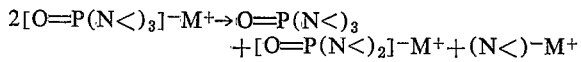

However, whatever is the exact structure of the various complexes obtained from an alkali metal and HMPT, it has been found that these complexes vigorously catalyse the polymerization and the rearrangements of organopolysiloxanes, and may with advantage be employed as catalysts in the preparation of organopolysiloxane oils and gums in place of the conventional alkaline catalysts such as the alkali metal hydroxides.

The catalyst used in the new process may be prepared, as indicated in the aforesaid publications, by dissolving the alkali metal in an appropriate quantity of HMPT or other aminophosphine oxide, optionally diluted with an organic diluent, and then added as such to the organopolysiloxane to be polymerized or rearranged.

It is also possible to prepare the catalyst in the presence of an organopolysiloxane and then to add the mixture obtained to the organopolysiloxane to be polymerized. This procedure is often advantageous, because it makes it possible to prepare in advance a quantity of catalyst sufficient for a number of operations, which may be employed over a period of days or weeks. Moreover, for polymerizing and rearranging operations which require only small quantities of catalyst, it is easier to make by dilution the exact quantities of catalyst required rather than to make a small quantity directly.

The organopolysiloxane employed to form such catalytic mixtures may be linear or cyclic. It may, for example, be a linear organopolysiloxane of the formula:

$$(R)_3SiO[Si(R)_2O]_nSi(R)_3 \quad \text{(II)}$$

where R represents a monovalent organic radical, for example alkyl of 1 to 4 carbon atoms, especially methyl, and $n$ an integer, for example from 1 to 12. An example of such a compound is tetradecamethylhexasiloxane. It may also be an $\alpha,\omega$-dihydroxy-diorganopolysiloxane oil, or a cyclic diorganopolysiloxane consisting of units of the formula:

$$-Si(R)_2O-$$

(where R is as hereinbefore defined), such as hexamethylcyclotrisiloxane or octamethylcyclotetrasiloxane. Mixtures of linear and cyclic compounds such as are yielded by hydrolysis of diorganodichlorosilanes, such as, for example, dimethyldichlorosilane, can also be used.

The catalysts used in the new process generally remain very fluid, but when polymerizable organopolysiloxanes are employed in their preparation a certain degree of polymerization occurs and in this case it is desirable to dilute the catalytic mixture with an inert organic diluent to reduce its viscosity. Suitable diluents are e.g., benzene, toluene, the xylenes, hexane or heptane.

The alkali metal used in the preparation of the catalysts is preferably potassium.

The aminophosphine oxides which may be employed may be represented by the formula:

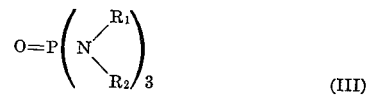

in which $R_1$ and $R_2$ are the same or different and are each monovalent hydrocarbon radicals or are joined to form with the adjacent nitrogen a heterocyclic radical. Although a wide variety of aminophosphine oxides may be employed, it is generally best to use compounds in which $R_1$ and $R_2$ are each alkyl of 1 to 4 carbon atoms, and especially HMPT.

The preparation of the catalyst can be very simply effected. It is sufficient to allow the alkali metal to dissolve in the anhydrous aminophosphine oxide, or in a mixture of aminophosphine oxide and organopolysiloxane, the operation being carried out in a nitrogen atmosphere, if desired with moderate heating in order to accelerate the dissolution.

It will be seen from the reaction given above that one molecular proportion of aminophosphine oxide is theoretically required for each atomic proportion of alkali metal in the formation of the catalyst. In practice, however, it is preferred to employ a larger proportion of aminophosphine oxide. There is no critical upper limit, and the appropriate proportion may readily be determined in each case, taking into account, e.g., the advantage which may be obtained, in ease of handling, by starting with a more or less dilute catalyst, and the desirability of avoiding the introduction of too much amiophosphine into the organopolysiloxane so that it becomes difficult to remove. Thus, in general 1 to 30 molecular proportions, and preferably 5 to 20 molecular proportions, of the amino phosphine oxide may be used for each atomic proportion of the alkali metal.

When the aminophosphine oxide/alkali metal catalyst is prepared in the presence of an organopolysiloxane, the proportion of this organopolysiloxane may vary within fairly wide limits, e.g., from a tenth to twenty times the weight of the aminophosphine oxide. If the organopolysiloxane is capable of acting as a chain limiter in the polymerizations for which the catalyst is intended, it will of course be necessary to prepare the catalytic mixture so that it contains a proportion of the oranopolysiloxane such that the addition of chain-limiting groupings during the addition of the catalyst to the medium to be polymerised is at most equal to that which it is desired to employ in the polymerization under consideration.

The process of polymerization and rearrangement according to the invention is applicable to all organosilicon compounds which are polymerisable and rearrangeable in alkaline media. More particularly, it is applicable to branched and unbranched linear organopolysiloxanes and to cyclic organopolysiloxanes, which may be grouped under the following general formula:

(IV)

in which $R_3$ represents an unsubstituted hydrocarbon radical or a hydrocarbon radical substituted by atoms or radicals such as halogen atoms or amino or cyano groups, $R_4$ represents a hydrogen atom or the radical $R_3$, and $a$ and $b$ each have a value from 0 to 3, the sum $a+b$ being lower than or equal to 3.

Suitable organopolysiloxanes of Formula IV include cyclic diorganopolysiloxanes, linear diorganopolysiloxanes terminated at each end of the chain by hydroxyl groups or triorganosilyl groupings or both, and conventional branched and linear organopolysiloxanes carrying on the silicon atoms hydroxyl or alkoxy groups at random or in predetermined manner. Moreover, the organopolysiloxanes of Formula IV may be rearranged and polymerized in the presence of silanes of the general formula:

$$(R_3)_cSi(OR_4)_{4-c} \quad (V)$$

in which the symbols $R_3$ and $R_4$ are as hereinbefore defined and $c$ is equal to 0, 1, 2 or 3.

In general, the most readily accessible starting materials for use in the new process are the linear organopolysiloxanes of the formula:

$$R_4O[Si(R_3)_2O]_nR_4$$

and the cyclic organopolysiloxanes of the formula:

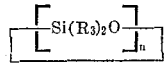

where $R_3$ is alkyl of 1 to 4 carbon atoms, alkenyl of 2 to 4 carbon atoms, or phenyl, $R_4$ is hydrogen, alkyl of 1 to 4 carbon atoms, alkenyl of 2 to 4 carbon atoms, or phenyl, and $n$ is an integer, alone or in admixture with a silane of formula:

$$(R_3)_cSi(OR_4)_{4-c}$$

where $c$ is 0, 1, 2, or 3 and $R_3$ and $R_4$ are as hereinbefore defined.

Suitable such organopolysiloxanes are: hexamethylcyclotrisiloxane, octamethylcyclotetrasiloxane, tetramethyltetravinylcyclotetrasiloxane, hexaphenylcyclotrisiloxane, octaphenylcyclotetrasiloxane, pentamethylpentaethylcyclopentasiloxane, hexamethyldisiloxane, octamethyltrisiloxane and its higher homologues, divinyltetramethyldisiloxanes, tetravinyldimethyldisiloxanes, $\alpha,\omega$-dihydroxy-dimethylpolysiloxanes and $\alpha,\omega$-dialkoxy-dimethylpolysiloxanes having from 2 to 100 silicon atoms, and tetraphenyldisiloxanediol. Examples of silanes which may be used in admixture with these organopolysiloxanes are methyltriethoxysilane, vinyltri(methoxyethoxy)silane, phenyltriethoxysilane, vinylmethyldiethoxysilane, diphenyldimethoxysilane and tetraethoxysilane. It will be understood that the organopolysiloxanes may be rearranged and polymerized separately or in admixture with one another or with the silanes of Formula V.

The quantity of catalyst employed in the new process may vary within fairly wide limits. In practice, however, quantities of catalyst corresponding to one atom of alkali metal for each 100 to 500,000 silicon atoms of organopolysiloxane to be polymerized or rearranged, are generally used.

The polymerization and rearrangement of the organopolysiloxanes, whether alone or in admixture with the aforesaid silanes, in accordance with the invention take place rapidly and at relatively low temperature. If it is desired to convert, for example, organocyclopolysiloxanes into gummy substances, the polymerization may then be carried out in a temperature range between ambient temperature (20-25° C.) and the temperature at which the conventional alkali catalysts react (up to 200° C.). This extended temperature range affords the possibility of choosing, for carrying out the process, the conditions best adapted to the particular technical requirements.

The time of the reaction may vary from a fraction of a minute to several hours. The progress of the reaction is easily followed by monitoring the viscosity of the reaction medium. When the viscosity, and therefore the molecular weight, have increased to the desired extent, the reaction is stopped.

The new process may be carried out at, below or above atmospheric pressure, but it is rarely desirable to use pressures other than atmospheric.

The great flexibility of the new process makes possible not only discontinuous polymerisations by the usual techniques, but also continuous polymerizations.

Sinse the ratio of aminophosphine oxide to alkali metal in the catalyst may be fairly low, the quantity of foreign matter, such as aminophosphine oxide, introduced into the organosilicon medium to be polymerized and rearranged by the addition of the catalyst is also low. Therefore, only a very small quantity of foreign matter has to be eliminated at the end of the reaction, if such an elimination is considered necessary at all.

The following examples illustrate the invention.

EXAMPLE 1

Into a 100-cc. round-bottomed flask provided with a stirrer, anhydrous HMPT (50 g.), octamethylcyclotetrasiloxane (15 g.), and potassium (0.7 g.) are introduced under a dry nitrogen atmosphere. This mixture is stirred at ambient temperature until the potassium has completely dissolved (about 30 minutes). The product is then diluted with anhydrous toluene to 100 cc. to give catalyst solution A.

Into a 2-litre round-bottomed flask continuously kept in a dry nitrogen atmosphere and containing 1000 g. of octamethylcyclotetrasiloxane at a temperature of 100° C. 2 cc. of catalyst solution A (corresponding to 14 mg. of potassium and 1 g. of HMPT) are introduced. The contents of the flask are maintained at 100° C. 11 minutes after the addition of the catalyst, the cyclic tetramer has been converted into a viscous oil having a viscosity of 500,000 cst. (centistokes) at 25° C., and 32 minutes after the addition of the catalyst, the contents of the flask have acquired a gummy consistency. 1 hour after the addition of the catalyst, the product is cooled to about 50° C. and the catalyst is neutralized by the addition of 80 mg. of ethyl iodide. 115 g. of volatile products are then removed by heating at 180° C. under reduced pressure (20 mm. Hg). A gum is thus obtained having an intrinsic viscosity, measured in toluene at 20° C., equal to 2.97 dl./g. (The method employed for measuring this intrinsic viscosity is that described in French Patent No. 1,250,070.)

EXAMPLE 2

Viscous oils having a viscosity of about 500,000 cst. at 25° C. are prepared with the aid of an HMPT-potassium-octamethylcyclotetrasiloxane catalytic system of the type described in Example 1, prepared from 15 g. of octamethylcyclotetrasiloxane, 0.7 g. of potassium, HMPT in various quantities and toluene in a quantity sufficient to give 100 cc. of solution.

1000 g. of octamethylcyclotetrasiloxane and various quantities of the catalytic mixture at different temperatures are introduced into a 2-litre round-bottomed flask in a dry nitrogen atmosphere and the mixture is allowed to react until an oil having a viscosity of 500,000 cst. at 25° C. is obtained.

The following table gives the operating conditions and the results obtained:

| Experiment No. | K mg. | HMPT, mg. | Temperature, °C. | Polymerization period |
|---|---|---|---|---|
| 1 | 8.4 | 100 | 98 | 3 hr. 20 min. |
| 2 | 14 | 20 | 100 | 6 hr. 15 min. |
| 3 | 14 | 200 | 100 | 2 hr. |
| 4 | 14 | 500 | 100 | 0 hr. 41 min. |
| 5 | 14 | 1,000 | 100 | 0 hr. 11 min. |
| 6 | 70 | 1,000 | 24 | 4 hr. 37 min. |
| 7 | 70 | 1,000 | 100 | 30 sec. |

EXAMPLE 3

Into a 150-cc. round-bottomed flask swept by a light current of anhydrous nitrogen HMPT (40 g.), tetradecamethylhexasiloxane (9 g.), and potassium (1 g.) are introduced. After dissolution of the potassium, the product obtained is diluted with HMPT to a total volume of 100 cc.

Into a 6-litre reaction vessel anhydrous octamethylcyclotetrasiloxane (3600 g.), 1,3,5,7-tetramethyl-1,3,5,7-tetravinylcyclotetrasiloxane (8.28 g.), and tetradecamethylhexasiloxane (2.49 g.) are introduced. The mixture is heated to 100° C. under a nitrogen atmosphere and 3.2 cc. of the catalyst solution (corresponding to 32 mg. of potassium and 2.90 g. of HMPT) are then added. After heating for 2 hours at 100° C., the contents of the flask are converted into a gum having a viscosity of 21.5 million cPo (centipoises) at 25° C. Moist nitrogen is then introduced to give a gum having a viscosity of 9.3 million cp. at 25° C. This gum is neutralized with 70 mg. of phosphoric acid and then heated at 190° C. under reduced pressure (65 mm. Hg) to remove volatile constituents. 3215 g. of gum having a viscosity of 18.5 million cp. at 25° C. are thus obtained.

100 parts of this gum are mixed with 50 parts of silica of combustion whose surface has received an organosilicon compound coating by heating in octamethylcyclotetrasiloxane, 1.8 parts of tetramethylethylenedioxydimethylsilane as plasticising agent, and 1.9 parts of a 50% dispersion of dichlorobenzoyl peroxide in a silicone oil. After malaxation, the mixture obtained is moulded in the form of plates 2 mm. thick and then heated at 125° C. under 50 bars pressure for 10 minutes. Some of the plates obtained are heated at 250° C. for a further 16 hours in a ventilated oven. Mechanical tests applied to these plates yielded the following results:

| Mechanical properties | Shore A hardness | Breaking strength, kg./cm.$^2$ | Elongation at rupture in percent | Tearing strength, kg./cm. |
|---|---|---|---|---|
| After 10 min. at 125° C. | 52 | 95 | 495 | 22.5 |
| After 16 hr. at 250° C. | 63 | 77 | 280 | 19 |

EXAMPLE 4

Into a 2-litre round-bottomed flask provided with a stirrer, a condenser and a dry nitrogen inlet, octomethylcyclotetrasiloxane (1,163 g.) and tetradecamethylhexasiloxane 37 g. are charged.

The mixture is heated to 100° C. and 12 cc. of a catalyst solution similar to that prepared in Example 2 (Test No. 4) (corresponding to 3 g. of HMPT and 84 mg. of potassium) are then added. After heating for 3 hours at 100° C., the product is neutralised by the addition of 0.3 g. of phosphoric acid, and the volatile products are then removed by heating under reduced pressure (5 mm. Hg) until a temperature of 240° C. is reached in the mass. 1056 g. of a dimethylpolysiloxane oil having terminal trimethylsilyl groups are thus obtained, the viscosity of which is 688 cst. at 20° C.

EXAMPLE 5

Into a 1-litre reaction vessel provided with a scraper-type stirrer, octamethylcyclotetrasiloxane (375 g.) and octaphenylcyclotetrasiloxane (75 g.) are introduced. By heating at about 165–170° C. under a light current of dry nitrogen, 50 g. of the methyl tetramer are eliminated to dry the reactants. The temperature of the mixture is then adjusted to 160° C., and 0.8 cc. of catalytic solution similar to that prepared in Example 2 (Test No. 4) (corresponding to 200 mg. of HMPT and 5.6 mg. of potassium) is then added. After heating at 160° C. for 30 minutes, an oil having a viscosity of 500,000 cst. at 20° C. is obtained. 1.2 cc. of water is then added to form Si—OH groups and, after heating for two hours, the catalyst is neutralized by the addition of 30 mg. of phosphoric acid, and the volatile products are removed by heating at 185° C. under reduced pressure (25 mm. Hg). 347 g. of α,ω-dihydroxypolysiloxane oil, formed of —Si(CH$_3$)$_2$O— and —Si(C$_6$H$_5$)$_2$O— groupings are thus obtained, having a viscosity of 11,100 cst. at 20° C. and containing 0.19% by weight of hydroxyl groups.

EXAMPLE 6

Into a 250-cc. reaction vessel, octamethylcyclotetrasiloxane (75 g.) and 1,3,5,7,9-pentamethyl-1,3,5,7,9-pentaethylcyclopentasiloxane (25 g.) are introduced. This mixture is heated to 100° C. under a nitrogen atmosphere and at this temperature 0.09 cc. of catalyst similar to that prepared in Example 3 (corresponding to 0.9 mg. of potassium and 83 mg. of HMPT) is added. The polymerisation begins after 12 minutes heating at 100° C. To the oil obtained after heating for 17 minutes, the viscosity of which is 500,000 cst. at 20° C. 200 mg. of water are added. Heating is then continued at 100° C. for 2 hours, the product is neutralised with 3 mg. of phosphoric acid, and the volatile products are removed by heating at 180° C. under reduced pressure (20 mm. Hg). 88 g. of α,ω-dihydroxypolysiloxane oil, formed of —Si(CH$_3$)$_2$O— and —Si(CH$_3$)(C$_2$H$_5$)O— groupings are thus obtained, having a viscosity of 4755 cst. at 20° C. and containing 0.1% by weight of hydroxyl groups.

EXAMPLE 7

At ambient temperature (20° C.) and under an anhydrous nitrogen atmosphere, 1000 g. of anhydrous octamethylcyclotetrasiloxane and 2 cc. of a catalyst solution similar to that of Example 1 (corresponding to 14 mg. of potassium and 1 g. of HMPT) are mixed. This mixture is continuously fed into an extruder and is preheated to 100° C. during its passage through the short supply pipe of the extruder. The extruder has the following characteristics: diameter 40 mm., ratio length/diameter=11. The operation is carried out with a compression ratio of 5.5, the extruder being heated to 150° C. At the end of the extruder, a gum having viscosity of 20 million cp. at 25° C. is obtained. The residence time of the mixture in the extruder is 3 minutes.

EXAMPLE 8

Under a nitrogen atmosphere, 0.466 g. of potassium is reacted with 39.534 g. of HMPT at about 50–60° C. The mixture first turns blue and by the end of half an hour has acquired a yellowish hue.

100 g. of octamethylcyclotetrasiloxane are introduced into a 250-cc. reaction vessel provided with a stirring system and a nitrogen admission duct, the temperature is raised to 100° C., and 0.6 g. of the catalytic mixture is added. The whole is maintained at 100° C. The viscosity of the medium rises very rapidly and a gum is obtained 3 minutes after the addition of the catalyst.

We claim:

1. Process for the preparation of an organopolysiloxane by the rearrangement and polymerization of a less highly polymerized or cyclic organopolysiloxane of the formula:

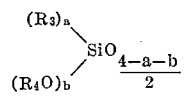

in which $R_3$ represents an unsubstituted hydrocarbon radical or a hydrocarbon radical substituted by atoms or radicals selected from the group consisting of halogen atoms or amino or cyano groups, $R_4$ represents a hydrogen atom or the radical $R_3$, and $a$ and $b$ each have a value from 0 to 3, the sum $a+b$ being lower than or equal to 3, which comprises subjecting the said less highly polymerized or cyclic organopolysiloxane to the action of, as catalyst, the product obtained by the reaction of (a) an alkali metal with (b) an aminophosphine oxide of the formula:

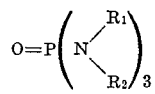

in which $R_1$ and $R_2$ are the same or different and are each monovalent hydrocarbon radicals or are joined to form with the adjacent nitrogen a heterocyclic radical.

2. Process according to claim 1 in which the aminophosphine oxide is of the formula:

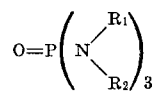

in which $R_1$ and $R_2$ are each alkyl of 1 to 4 carbon atoms.

3. Process according to claim 2 in which $R_1$ and $R_2$ are both methyl.

4. Process according to claim 1 in which the said catalyst is obtained by the reaction of 1 to 30 molecular proportions of the aminophosphine oxide with each atomic proportion of the alkali metal.

5. Process according to claim 4 in which 5 to 20 molecular proportions of the aminophosphine oxide are used for each atomic proportion of alkali metal.

6. Process according to claim 4 in which the alkali metal is potassium.

7. Process according to claim 1 in which the amount of the said catalyst used corresponds to one atom of alkali metal for each 100 to 500,000 atoms of silicon in the organopolysiloxane to be polymerized.

8. Process according to claim 4 in which the said catalyst is produced by the reaction of the said alkali metal with the said aminophosphine oxide in the presence of a fluid organopolysiloxane.

9. Process according to claim 8 in which the said fluid organopolysiloxane is an organocyclopolysiloxane consisting of units of the formula:

10. Process according to claim 8 in which the said fluid organopolysiloxane is a linear organopolysiloxane of the formula:

where $n$ is an integer.

11. Process according to claim 8 in which the amount of the fluid organopolysiloxane present during the preparation of the catalyst is from a tenth to twenty times the weight of the aminophosphine oxide.

12. Process according to claim 1 in which the less highly polymerized or cyclic organopolysiloxane is of the formula:

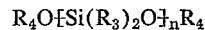

or

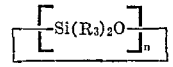

respectively, where $R_3$ is alkyl of 1 to 4 carbon atoms, alkenyl of 2 to 4 carbon atoms, or phenyl, $R_4$ is hydrogen, alkyl of 1 to 4 carbon atoms, alkenyl of 2 to 4 carbon atoms, or phenyl, and $n$ is an integer from 1 to 12, alone or in admixture with a silane of formula:

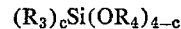

where $c$ is 0, 1, 2, or 3 and $R_3$ and $R_4$ are as hereinbefore defined.

References Cited

UNITED STATES PATENTS

| | | | |
|---|---|---|---|
| 2,739,952 | 3/1956 | Linville | 260—448.2 |
| 2,830,967 | 4/1958 | Nitzsche et al. | 260—448.2 |
| 3,186,967 | 6/1965 | Nitzsche et al. | 260—46.5 |
| 3,274,153 | 9/1966 | Hyde et al. | 260—448.2 |
| 3,294,740 | 12/1966 | McVannel | 260—448.2 |

DONALD E. CZAJA, *Primary Examiner.*

M. I. MARQUIS, *Assistant Examiner.*